United States Patent
Lin

(10) Patent No.: US 11,231,332 B2
(45) Date of Patent: Jan. 25, 2022

(54) MEASURING APPARATUS AND PHYSICAL CHARACTERISTIC MEASURING DEVICE

(71) Applicant: Wistron Corporation, New Taipei (TW)

(72) Inventor: Ting-Yu Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 334 days.

(21) Appl. No.: 16/502,024

(22) Filed: Jul. 3, 2019

(65) Prior Publication Data

US 2020/0300713 A1    Sep. 24, 2020

(30) Foreign Application Priority Data

Mar. 19, 2019   (TW) .................................. 108109322

(51) Int. Cl.
  *G01K 7/24*   (2006.01)
  *G01K 1/14*   (2021.01)
  *G01K 1/02*   (2021.01)

(52) U.S. Cl.
  CPC .............. *G01K 7/24* (2013.01); *G01K 1/026* (2013.01); *G01K 1/14* (2013.01); *G01K 2219/00* (2013.01)

(58) Field of Classification Search
  CPC ............ G01K 7/24; G01K 1/026; G01K 1/14; G01K 2219/00
  See application file for complete search history.

(56) References Cited

U.S. PATENT DOCUMENTS

| | | | | |
|---|---|---|---|---|
| 5,637,275 A | * | 6/1997 | Carey | G01N 35/1002 422/64 |
| 2007/0072257 A1 | | 3/2007 | Negulescu et al. | |
| 2009/0280476 A1 | * | 11/2009 | Srinivasan | C12Q 1/68 435/6.11 |
| 2011/0117542 A1 | | 5/2011 | Abassi et al. | |
| 2013/0230881 A1 | * | 9/2013 | Yasuda | G01N 33/48728 435/29 |
| 2015/0301026 A1 | | 10/2015 | Rajaraman et al. | |
| 2017/0122802 A1 | * | 5/2017 | Brown | E06B 9/24 |

OTHER PUBLICATIONS

"Office Action of Taiwan Counterpart Application", dated May 12, 2020, p. 1-p. 7.

* cited by examiner

*Primary Examiner* — Nathaniel T Woodward
*Assistant Examiner* — Philip L Cotey
(74) *Attorney, Agent, or Firm* — JCIPRNET

(57) ABSTRACT

A measuring apparatus and a physical characteristic measuring device are provided. The measuring apparatus includes at least one first physical characteristic measuring device and a data processing device. The first physical characteristic measuring device includes a sensor, a signal processing circuit, and a transmission path. The sensor generates a measurement signal according to the physical characteristics of a location where the first physical characteristic measuring device is located. The signal processing circuit converts the measurement signal into a first processed signal. The transmission path is able to be electrically connected to a second physical characteristic measuring device. The transmission path passes a second processed signal of the second physical characteristic measuring device to the data processing device in response to the first physical characteristic measuring device and the second physical characteristic measuring device being electrically connected to each other.

10 Claims, 5 Drawing Sheets

MEASURING APPARATUS AND PHYSICAL CHARACTERISTIC MEASURING DEVICE

CROSS-REFERENCE TO RELATED APPLICATION

This application claims the priority benefit of Taiwan application serial no. 108109322, filed on Mar. 19, 2019. The entirety of the above-mentioned patent application is hereby incorporated by reference herein and made a part of this specification.

BACKGROUND

Technical Field

The disclosure relates to a physical characteristic measuring technique, and more particularly to a measuring apparatus and a physical characteristic measuring device.

Description of Related Art

In the physical characteristic detection technology for biomaterials or non-biological materials, the materials are often carried by a fritted disc, and the current physical characteristic changes of the material corresponding to every pore in the fritted disc is measured one by one using a measuring device or a recorder. The physical characteristic changes are, for example, changes in values such as temperature, humidity, etc. However, when it is required to simultaneously measure the physical characteristic changes of the materials in multiple pores, multiple corresponding measuring devices (for example, multiple temperature lines) are required to measure at the same time. The set-up and steps for performing the relevant experiment are very cumbersome and time consuming.

Therefore, when using the fritted disc to carry materials, how to use the appropriate physical characteristic measuring device to properly measure the physical characteristics of the materials in the required pores, thereby speeding up the detection process, is one of the problems in detection technology.

SUMMARY

The disclosure provides a measuring apparatus and a physical characteristic measuring device, which designs the physical characteristic measuring device by modularization to allow the user to set the physical characteristic measuring device in a convenient and easy to use manner according to the user's requirements (for example, to measure the content of a specific pore in a fritted disc), thereby measuring the required physical specific values in the specific pore.

The measuring apparatus of the disclosure includes at least one first physical characteristic measuring device and a data processing device. The first physical characteristic measuring device includes a sensor, a signal processing circuit, and a transmission path. The sensor is used to generate a measurement signal according to the physical characteristics of a location where the first physical characteristic measuring device is located. The signal processing circuit is coupled to the sensor to convert the measurement signal into a first processed signal. The transmission path is able to be electrically connected to at least one second physical characteristic measuring device. The data processing device is used to receive and process the first processed signal. The transmission path passes the second processed signal of the second physical characteristic measuring device to the data processing device in response to the first physical characteristic measuring device and the second physical characteristic measuring device being electrically connected to each other, wherein the data processing device receives and processes the second processed signal.

The physical characteristic measuring device of the disclosure includes a sensor, a signal processing circuit, and a transmission path. The sensor generates a measurement signal according to the physical characteristics of a location where the physical characteristic measuring device is located. The signal processing circuit is coupled to the sensor to convert the measurement signal into a first processed signal. The transmission path is able to be electrically connected to another physical characteristic measuring device. The transmission path passes the second processed signal of the another physical characteristic measuring device to the data processing device in response to the physical characteristic measuring device and the another physical characteristic measuring device being electrically connected to each other.

Based on the above, the embodiment of the disclosure designs the physical characteristic measuring device in a modular form, so that the user does not require additional wires to connect the physical characteristic measuring devices and the relevant components (for example, the data processing device) to form the measuring apparatus. Moreover, the measuring apparatus may set the locations of the physical characteristic measuring devices in an easy to use manner according to the user's requirements (for example, to measure the contents of a plurality of specific pores in a fritted disc), thereby conveniently measuring the required physical specific values in the specific pores. As such, since it is not required to connect additional wires while the measurement is performed using a modular physical characteristic measuring device, the time taken for the set-up and steps for performing the relevant experiment is saved.

To make the aforementioned and other features of the disclosure more comprehensible, several embodiments accompanied with drawings are described in detail as follows.

DETAILED DESCRIPTION OF DISCLOSED EMBODIMENTS

Figure 1:
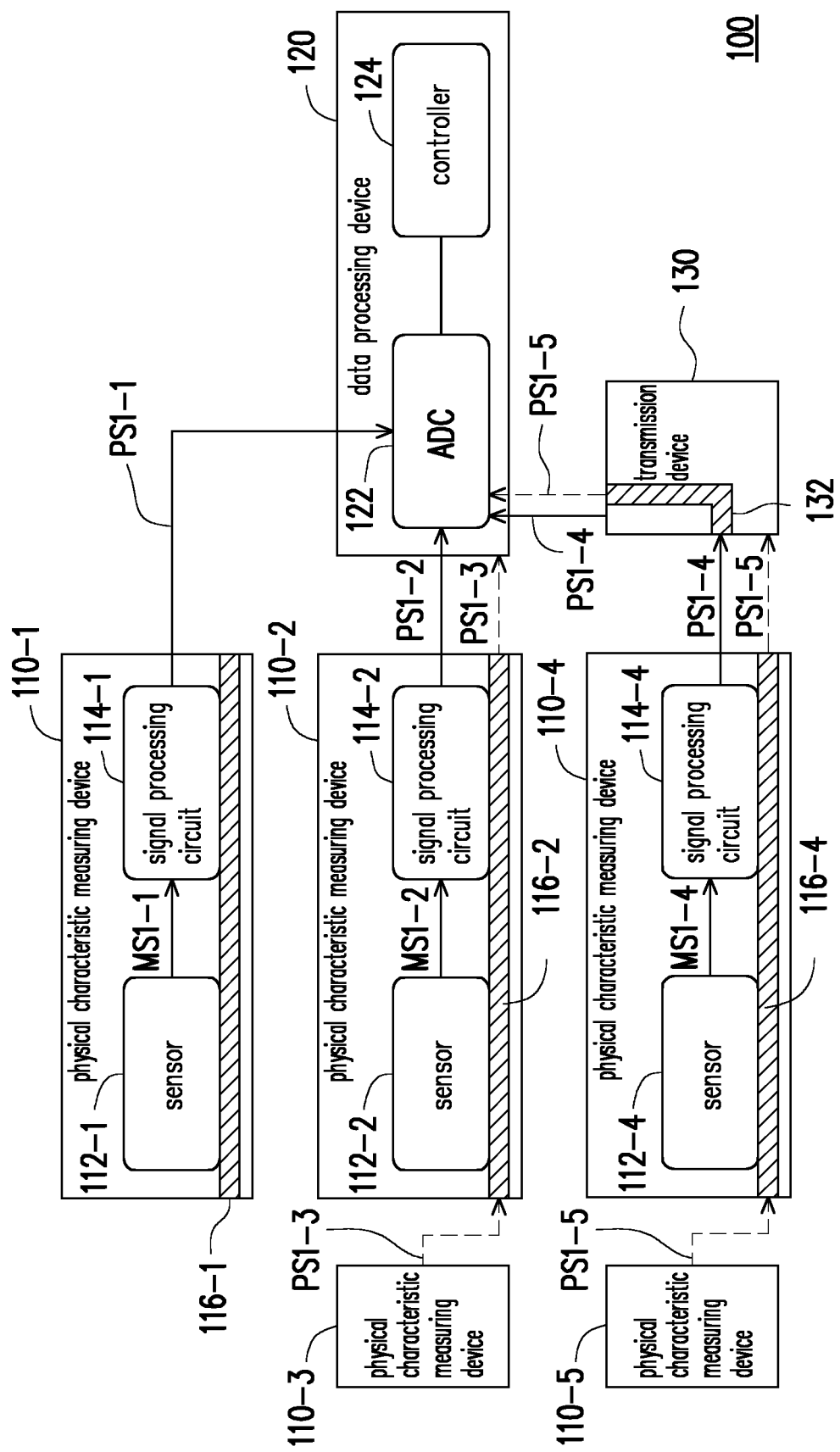
FIG. 1 is a functional block diagram of a measuring apparatus in accordance with an embodiment of the disclosure.
Figure 2:
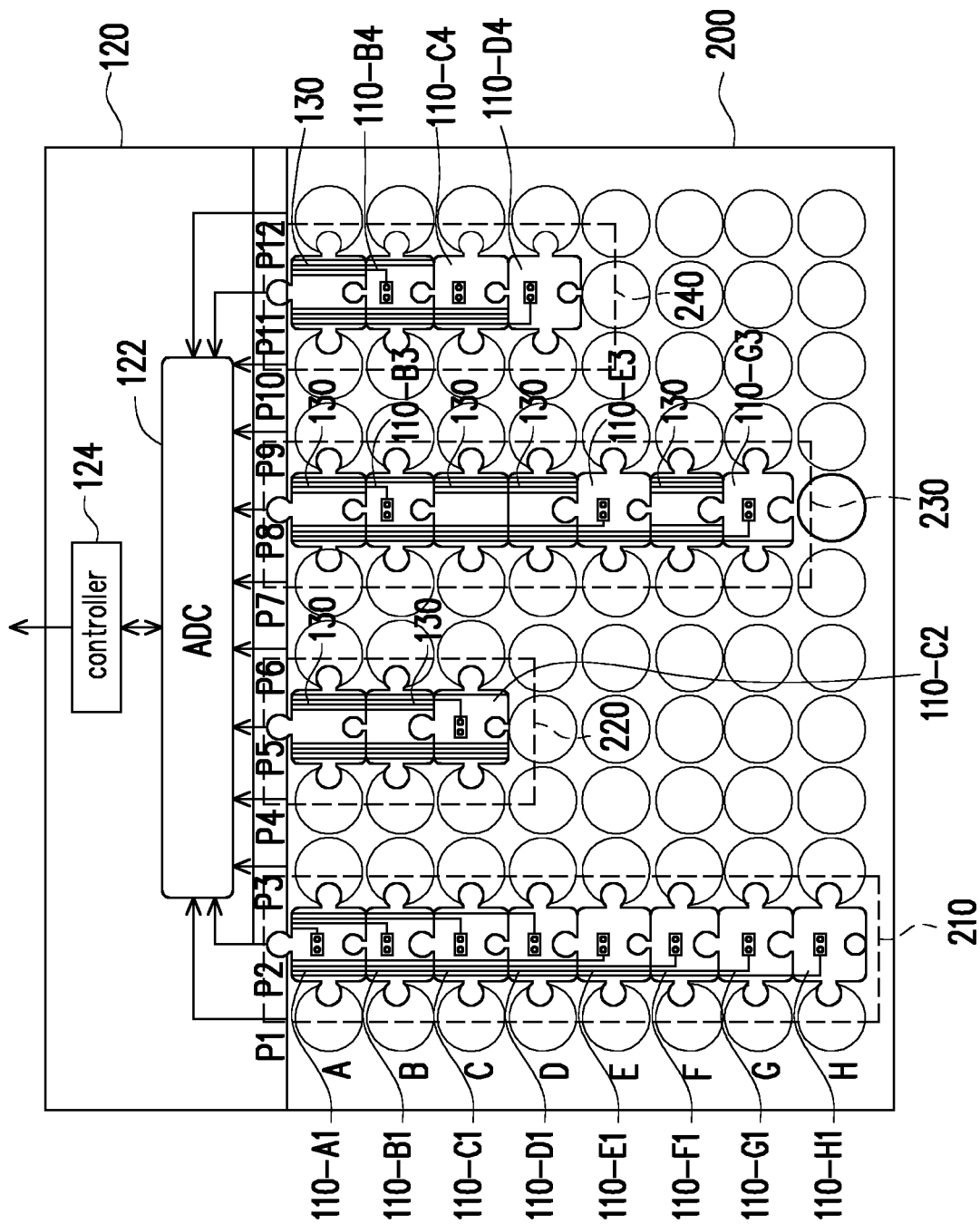
FIG. 2 is a schematic diagram of a measuring apparatus and a fritted disc in accordance with an embodiment of the disclosure.
Figure 3:
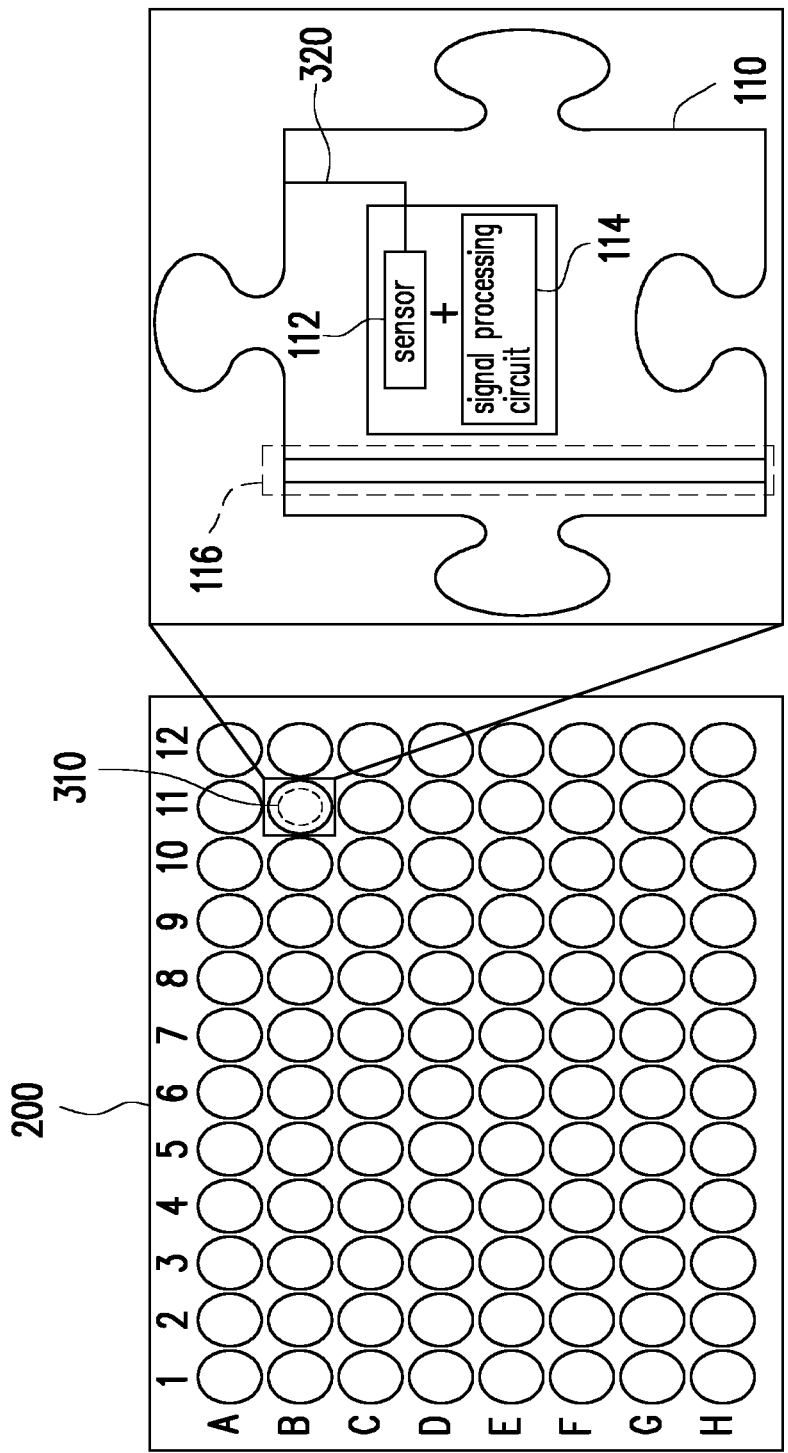
FIG. 3 is a schematic diagram of a physical characteristic measuring device and a fritted disc in accordance with an embodiment of the disclosure.

FIG. 1 is a functional block diagram of a measuring apparatus 100 in accordance with an embodiment of the disclosure. FIG. 2 is a schematic diagram of a measuring apparatus 100 and a fritted disc 200 in accordance with an embodiment of the disclosure. FIG. 3 is a schematic diagram of a physical characteristic measuring device 110 and a fritted disc 200 in accordance with an embodiment of the disclosure. Specifically, FIG. 2 is a schematic structure of combining a plurality of physical characteristic measuring devices, a data processing device 120, and a plurality of transmission devices 130 in the measuring apparatus 100 in a modular form, and disposed on the fritted disc 200. Furthermore, FIG. 3 is a conceptual diagram of designing the physical characteristic measuring device 110.

The measuring apparatus 100 of the embodiment may be used to measure physical characteristic changes of a material in a pore of the fritted disc 200. The fritted disc 200 may be a 96-pore disc composed of 8 rows and 12 columns of pores. Persons applying the embodiment may apply the measuring apparatus 100 to fritted discs of different sizes according to requirements, and the fritted disc is not limited to the 96-pore disc. In addition, many physical characteristic measuring devices mentioned in the embodiment are all designed in a modular form, so that the user does not require additional wires to connect the physical characteristic measuring devices and the relevant components (for example, the data processing device), so as to form the measuring apparatus. Therefore, the appearances of the physical characteristic measuring devices are all puzzle shaped or splicable geometric shaped. In the embodiment, it is necessary to explain the reason for the plurality of physical characteristic measuring devices being able to be electrically connected and spliced with one other. In some paragraphs, a first physical characteristic measuring device and a second physical characteristic measuring device are described. It should be understood by persons applying the embodiment that the first and second physical characteristic measuring devices both belong to the physical characteristic measuring devices according to the embodiment of the disclosure.

Referring to FIG. 1 to FIG. 3 simultaneously, the measuring apparatus 100 includes at least one physical characteristic measuring device (for example, physical characteristic measuring devices 110-1 to 110-5 in FIG. 1, physical characteristic measuring devices 110-A1, 110-B1, 110-C1, 110-D1, 110-E1, 110-F1, 110-G1, 110-H1, 110-C2, 110-B3, 110-E3, 110-G3, 110-B4, 110-C4, and 110-D4 in FIG. 2, and physical characteristic measuring device 110 in FIG. 3) and the data processing device 120. The physical characteristic measuring device of the embodiment includes a sensor, a signal processing circuit, and a transmission path. For example, the physical characteristic measuring devices 110-1, 110-2, and 110-4 of FIG. 1 respectively includes sensors 112-1, 112-2, and 112-4, signal processing circuits 114-1, 114-2, and 114-4, and transmission paths 116-1, 116-2, and 116-4; the physical characteristic measuring device 110 of FIG. 3 includes a sensor 112, a signal processing circuit 114, and a transmission path 116.

For convenience of description, the physical characteristic measuring device of the embodiment is exemplified using a temperature measuring device, the sensor in the embodiment may be a thermistor for use as a temperature sensor, and the signal processing circuit may be a bleeder circuit used to process signals generated by the thermistor. Persons applying the embodiment should be readily aware that the thermistor may be replaced with another type of sensor to change the function of the physical characteristic measuring device used as the temperature measuring device. For example, the sensor in the physical characteristic measuring device may also be a humidity sensor, a capacitance change sensor, an illuminance sensor, a sensor targeting a specific chemical substance, etc. Embodiments of the disclosure do not limit the application type of the physical characteristic measuring device and the sensor therein.

Here, the illustration of the plurality of physical characteristic measuring devices according to the embodiments of the disclosure are exemplified using the physical characteristic measuring device 110-1 and the elements therein. The sensor 112-1 is used to generate a measurement signal according to the physical characteristics of a corresponding location where the physical characteristic measuring device 110-1 is located. For example, the sensor 112-1 generates a measurement signal MS1-1 at the physical characteristics of the physical characteristic measuring device 110-1. The signal processing circuit 114-1 is coupled to the sensor 112-1 to convert the measurement signal MS1-1 into a first processed signal PS1-1. So on and so forth, the physical characteristic measuring devices 110-1 to 110-5 respectively generates first processed signals PS1-1 to PS1-5. In detail, the sensors 112-1, 112-2, and 112-4 respectively generates measurement signals MS1-1, MS1-2, and MS1-4, and the signal processing circuits 114-1, 114-2, and 114-4 respectively converts the measurement signals MS1-1, MS1-2, and MS1-4 into the first processed signals PS1-1, PS1-2, and PS1-4. The transmission path 116-1 enables the physical characteristic measuring device 110-1 (also referred to as the first physical characteristic measuring device) to be electrically connected to another physical characteristic measuring device (also referred to as the second physical characteristic measuring device). Thereby, the transmission path 116-1 is able to pass a second processed signal of the other physical characteristic measuring device to the next physical characteristic measuring device or the data processing device 120 in response to the physical characteristic measuring device 110-1 and the other physical characteristic measuring device being electrically connected to each other.

The physical characteristic measuring device 110-1 in FIG. 1 is not connected to another physical characteristic measuring device, but the physical characteristic measuring device 110-2 is connected to another physical characteristic measuring device 110-3, and a physical characteristic measuring device 110-4 is connected to another physical characteristic measuring device 110-5. The other physical characteristic measuring devices 110-3 and 110-5 may also be connected to other physical characteristic measuring devices.

On the other hand, the measuring apparatus 100 further includes at least one transmission device 130. The transmission device 130 may include a transmission path 132. The physical characteristic measuring devices 110-1 and 110-2 are both directly coupled to the data processing device 120, and convert the measurement signals into the processed signal PS1-1 and the processed signal PS1-2. The transmission path 116-2 passes the processed signal PS1-3 (the second processed signal) of the physical characteristic measuring device 110-3 (the second physical characteristic measuring device) to the data processing device 120 in response to the physical characteristic measuring device 110-2 (the first physical characteristic measuring device) and the physical characteristic measuring device 110-3 (the second physical characteristic measuring device) being electrically connected to each other.

The physical characteristic measuring device 110-3 passes the processed signal PS1-3 generated by the physical characteristic measuring device 110-3 through the transmission path 116-2 of the physical characteristic measuring device 110-2 to the data processing device 120. The physical characteristic measuring device 110-4 (also referred to as the first physical characteristic measuring device) passes the processed signal PS1-4 (the first processed signal) generated by the physical characteristic measuring device 110-4 through the transmission device 130 and the transmission path 132 therein to the data processing device 120. Moreover, the processed signal PS1-5 (the second processed signal) is also passed through the transmission path 116-4 of the physical characteristic measuring device 110-4 and the transmission device 130 to the data processing device 120, thereby responding to the physical characteristic measuring device 110-4 and the physical characteristic measuring device 110-5 being electrically connected to each other.

The data processing device 120 is used to receive and process the processed signals, such as the directly received processed signals PS1-1 and PS1-2 in FIG. 1, and the processed signals PS1-3, PS1-4, and PS1-5 indirectly received through the physical characteristic measuring device 110-2 and the transmission device 130. The processed signals PS1-1, PS1-2, and PS1-4 may also be referred to as the first processed signals, and the processed signals PS1-3 and PS1-5 may also be referred to as the second processed signals. In detail, the data processing device 120 includes an analog-to-digital converter (ADC) 122 and a controller 124.

The ADC 122 is coupled to at least one physical characteristic measuring device (for example, coupled to the physical characteristic measuring devices 110-1 and 110-2). The ADC 122 is used to convert analogous first processed signals PS1-1, PS1-2, and PS1-4 into digital first processed signals PS1-1, PS1-2, and PS1-4. Moreover, the ADC 122 also converts analogous second processed signals PS1-3 and PS1-5 into digital second processed signals PS1-3 and PS1-5 in response to the physical characteristic measuring device 110-2 and the physical characteristic measuring device 110-3 being electrically connected to each other, and the physical characteristic measuring device 110-4 and the physical characteristic measuring device 110-5 being electrically connected to each other.

The controller 124 is used to process and provide digital first processed signals, and also process and provide digital second processed signals in response to the first physical characteristic measuring device and the second physical characteristic measuring device being electrically connected to each other. Persons applying the embodiment may use the signals processed by the controller to obtain the processed signals generated by respective physical characteristic measuring devices, so as to know the physical characteristics and changes thereof of the content in each pore. The controller 124 may also communicate with an external computing device (for example, a computer or a smartphone) to allow the external computing device to obtain the signals detected by the respective physical characteristic measuring devices, and present the signals on the display screen of the external computing device in the form of texts or graphics.

Here, the exterior design of the physical characteristic measuring device 110 is illustrated. Referring to FIG. 3, the physical characteristic measuring device 110 of FIG. 3 is used to measure the physical characteristic changes generated by the content in a pore 310 of the fritted disc 200. Therefore, the exterior design of the physical characteristic measuring device 110 is designed to cover the entire pore and presented as puzzle shaped. In addition, in order to make the physical characteristic measuring device 110 easier to place on the pore 310, the appearance of the physical characteristic measuring device 110 may also be slightly presented as a groove or a protrusion corresponding to the pore 310. In addition to the sensor 112, the signal processing circuit 114-1, and the transmission path 116, the physical characteristic measuring device 110 is also equipped with a transmission path 320 for passing the processed signals to the next physical characteristic measuring device or the data processing device 120.

Figure 4:
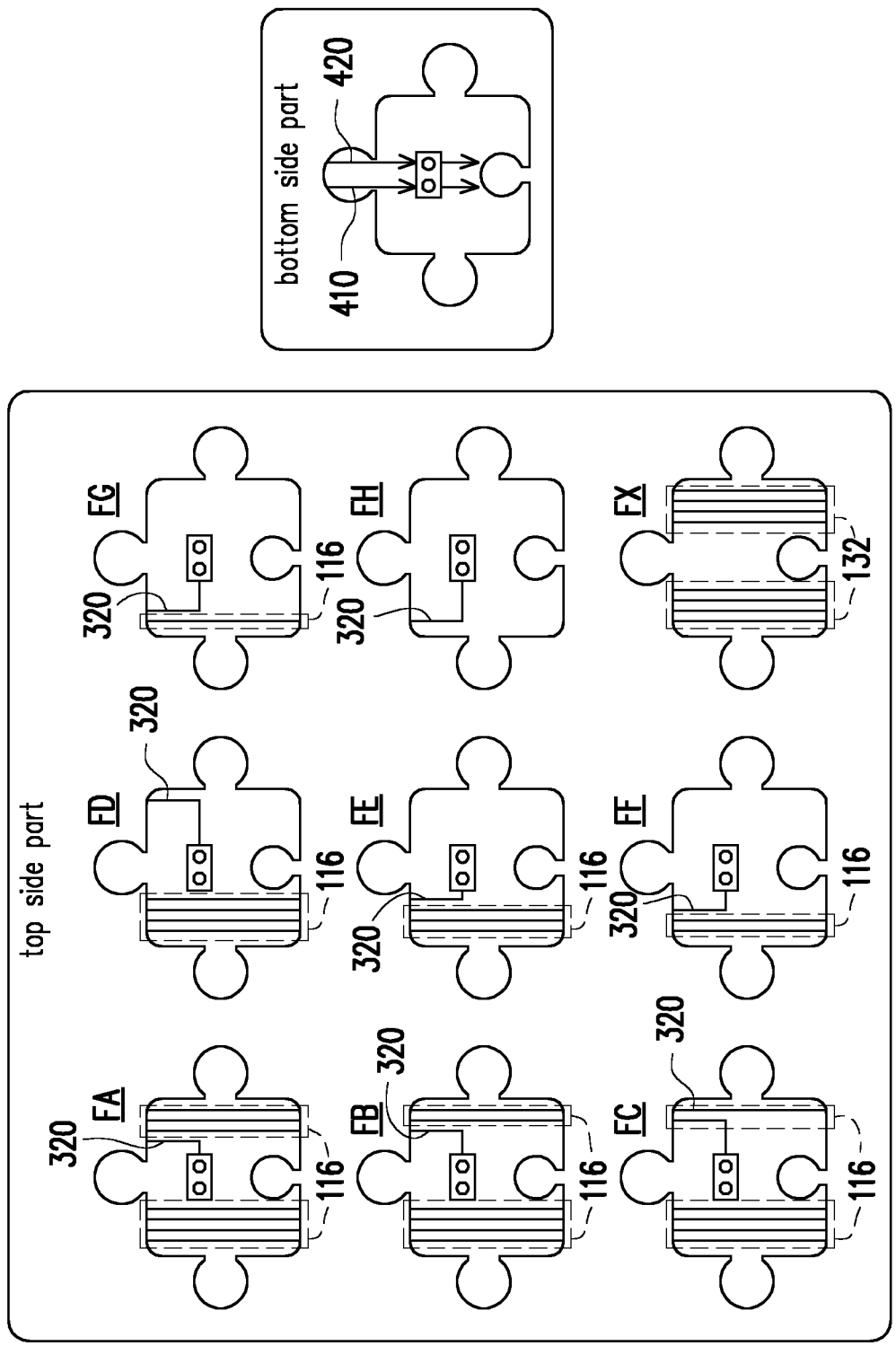
FIG. 4 is a circuit diagram of top side parts and bottom side parts of various physical characteristic measuring devices and a transmission device in accordance with an embodiment of the disclosure.

Here, the circuit design of a physical characteristic measuring device 110 and a transmission device 130 with respect to the signal path and the power path is illustrated. FIG. 4 is a circuit diagram of a top side part and a bottom side part of various physical characteristic measuring devices and a transmission device in accordance with an embodiment of the disclosure. Referring to FIG. 4, the physical characteristic measuring device and the transmission device of the embodiment may be implemented using a single-layer printed circuit board in combination with a sensor and a signal processing circuit. The single-layer printed circuit board has two sides. The embodiment uses a first side of the single-layer printed circuit board (for example, the top side part of the physical characteristic measuring device) for paving the signal path, as shown on the left side of FIG. 4. The left side of FIG. 4 presents nine types FA to FH and a type FX, wherein the types FA to FH belong to the physical characteristic measuring devices. The black boxes in the middle of the types FA to FH are the locations of the sensor and the signal processing circuit, and the line segments on the types FA to FH include a transmission path 116 and a transmission path 320. The transmission path 116 is used to pass another processed signal generated by another physical characteristic measuring device electrically connected to the physical characteristic measuring device. The transmission path 320 is used to pass a processed signal generated by the physical characteristic measuring device. The type FX on the other hand is a transfer device (or also referred to as a dummy device). The type FX is not equipped with a sensor and a signal processing circuit, and only has one transmission path 132 for passing the processed signal generated by the physical characteristic measuring device electrically connected to the transmission device.

It can be observed from the left side of FIG. 4 that the number and routing method of the transmission path 132 in the types FA to FH are slightly different. In the embodiment, the back of the physical characteristic measuring device of the type FA may be connected to the physical characteristic measuring devices of the types FB to FH; the back of the physical characteristic measuring device of the type FB may be connected to the physical characteristic measuring devices of the types FC to FH, and so on, so that the types of the physical characteristic measuring devices may have more diverse connection methods and connection variations. Specifically, since the physical characteristic measuring devices 110-H1 and 110-D4 in FIG. 1 are located at the end of the physical characteristic measuring devices electrically connected to each other, physical characteristic measuring devices without any transmission path (that is, the type FH on the left of FIG. 4) may be adopted.

In the embodiment, the second side of the single-layer printed circuit board (the bottom side part of the physical characteristic measuring device) is also used as a pavement for power source connection path. As shown on the right of FIG. 4, regardless of whether it is the physical characteristic measuring device 110 or the transmission device 130, the second sides of the single-layer printed circuit boards thereof both have power source connection paths 410 and 420. The power source connection path 410 may be connected to the power source terminal of the data processing device and the power source connection path 420 may be connected to the ground terminal of the data processing device. As such, the power source connection paths 410 and 420 pass the power provided by the data processing device to the physical characteristic measuring device and the transmission device electrically connected to each other.

Returning to FIG. 2, the data processing device 120 in FIG. 2 may have a plurality of connection points, each of the connection points corresponds to each row in the fitted disc 200. The connection points are presented as P1 to P12 in FIG. 2. The connection points P1 to P12 may be interlocked with the physical characteristic measuring device 110 and the transmission device 130 in a puzzle form, so that the transmission path of the signals in the physical characteristic measuring device 110 and the transmission device 130, and the power source connection path may be electrically connected to the data processing device 120.

Here, a plurality of dashed boxes 210 to 240 will be used to describe various situations of the physical characteristic measuring device 110 and the transmission device 130 being interlocked with each other. The dashed box 210 (Situation 1) is a device string formed by a plurality of physical characteristic measuring devices being connected with one other and is connected to the connection point P2 of the data processing device 120. The dashed boxes 220, 230, and 240 are respectively a device string formed by connecting at least one physical characteristic measuring device and at least one transmission device to each other, and are respectively connected to the connection points P5, P8, and P11 of the data processing device 120.

The plurality of physical characteristic measuring devices 110-A1, 110-B1, 110-C1, 110-D1, 110-E1, 110-F1, 110-G1, and 110-H1 in the dashed box 210 respectively corresponds to the types FA, FB, FC, FD, FE, FF, FG, and FH in FIG. 4. Therefore, the plurality of interconnected physical characteristic measuring devices in the dashed box 210 may pass the self-generated processed signals to the data processing device 120. In addition, the dashed box 210 have also depicted the transmission paths of the signals of the plurality in physical characteristic measuring devices.

Figure 5:
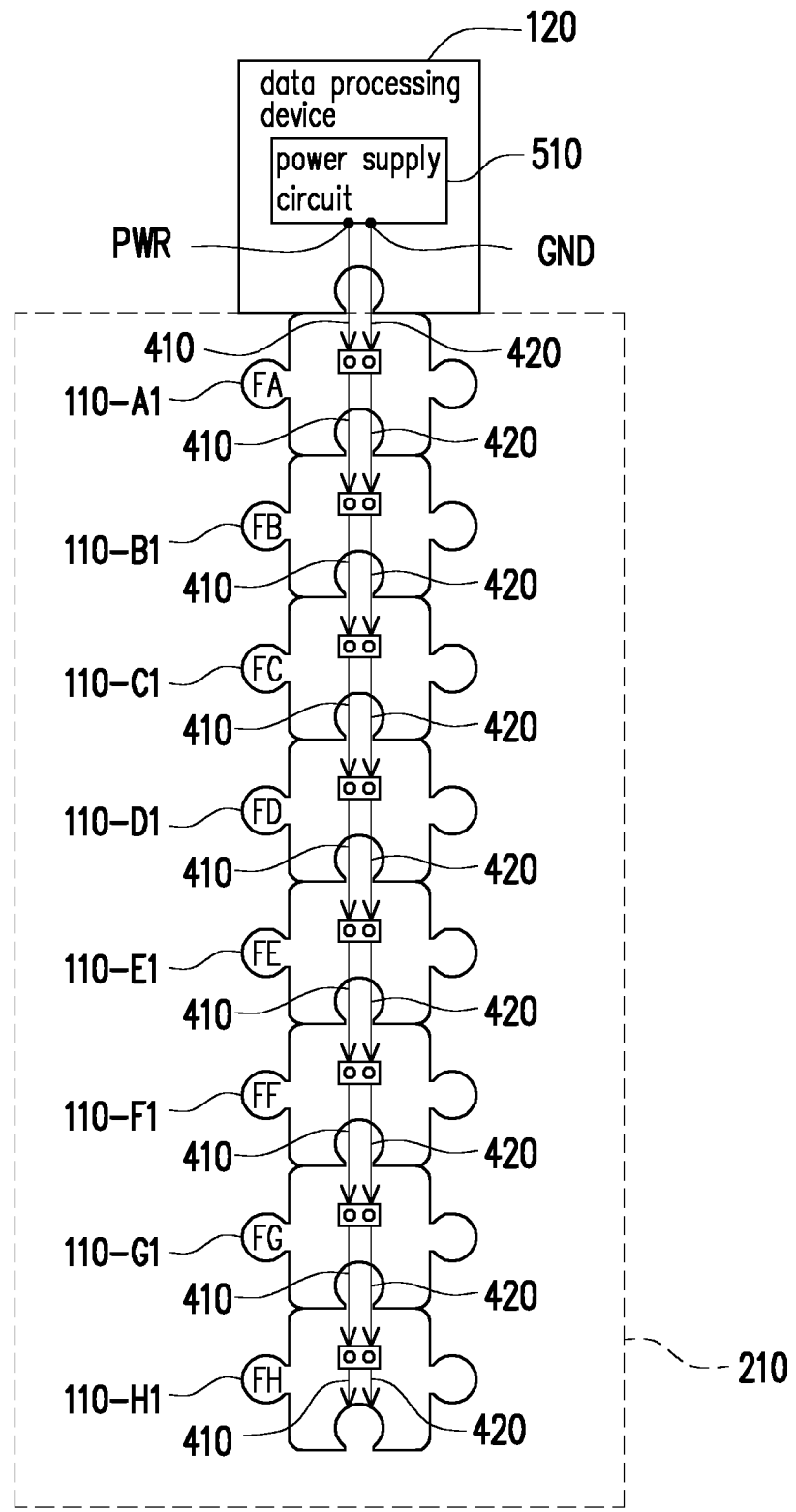
FIG. 5 is a circuit diagram of bottom side parts of various physical characteristic measuring devices presented in a dashed box 210 of FIG. 2 in accordance with an embodiment of the disclosure.

On the other hand, FIG. 5 is a circuit diagram of bottom side parts of various physical characteristic measuring devices presented in a dashed box 210 of FIG. 2 in accordance with an embodiment of the disclosure. Referring to FIG. 5, a data processing device 120 further includes a power supply circuit 510, which has a power source terminal PWR and a ground terminal GND. A power source connection path 410 of each of the physical characteristic measuring devices is connected to the power source terminal PWR and a power source connection path 420 of each of the physical characteristic measuring devices is connected to the ground terminal GND, so that the power provided by the data processing device 120 is passed to the physical characteristic measuring device and the transmission device electrically connected to each other. In the embodiment, the physical characteristic measuring device and the transmission device are designed using pore distribution in the column direction. Therefore, the circuit routings of the signal transmission path and the power source connection path are both in the column direction. Thus, persons applying the embodiment should be able to design the signal transmission path and the power source connection path in the physical characteristic measuring device and the transmission device using a pore distribution in the row direction or a pore distribution in the matrix form, and the embodiment of the disclosure is not limited thereto.

Referring back to FIG. 2, the dashed box 220 (Situation 2) has two transmission devices 130 and the physical characteristic measuring device 110-C2 belonging to the type FC in FIG. 4, so that the processed signals generated by the physical characteristic measuring device 110-C2 are passed to the data processing device 120 via two transmission devices 130. The dashed box 230 (Situation 3) has four transmission devices 130 belonging to the type FX in FIG. 4, the physical characteristic measuring device 110-B3 belonging to the type FB in FIG. 4, and the physical characteristic measuring device 110-E3 belonging to the type FE in FIG. 4, and the physical characteristic measuring device 110-G3 belonging to the type FG in FIG. 4. The processed signals generated by the physical characteristic measuring devices 110-B3, 110-E3, and 110-G3 are passed to the data processing device 120 via the physical characteristic measuring devices and the transmission device 130 electrically connected to each other in the dashed box 230. The dashed box 240 (Situation 4) has one transmission device 130 belonging to the type FX in FIG. 4, the physical characteristic measuring device 110-B4 belonging to the type FB in FIG. 4, the physical characteristic measuring device 110-C4 belonging to the type FF in FIG. 4, and the physical characteristic measuring device 110-D4 belonging to the type FH in FIG. 4. The processed signals generated by the physical characteristic measuring devices 110-B4, 110-C4, and 110-D4 are passed to the data processing device 120 via the physical characteristic measuring devices and the transmission device 130 electrically connected to each other in the dashed box 240.

Based on the above, the embodiments of the disclosure design the physical characteristic measuring devices in a modular form, so that the user does not require additional wires to connect the physical characteristic measuring devices and the relevant components (for example, the data processing device) to form the measuring apparatus. Moreover, the measuring apparatus may set the locations of the physical characteristic measuring devices in an easy to use manner according to the user's requirements (for example, to measure the contents of a plurality of specific pores in a fritted disc), thereby conveniently measuring the required physical specific values in the specific pores. As such, since it is not required to connect additional wires and the measurement is performed using the modular physical characteristic measuring device, the time taken for the set-up and steps for performing the relevant experiment is saved.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A measuring apparatus, comprising:
at least one first physical characteristic measuring device, comprising:
a sensor configured to generate a measurement signal according to physical characteristics of a location where the at least one first physical characteristic measuring device is located;
a signal processing circuit, coupled to the sensor, configured to convert the measurement signal into a first processed signal; and a transmission path able to be electrically connected to at least one second physical characteristic measuring device, a data processing device configured to receive and process the first processed signal, wherein the transmission path passes a second processed signal of the at least one second physical characteristic measuring device to the data processing device in response to the at least one first physical characteristic measuring device and the at least one second physical characteristic being electrically connected to each other, wherein the data processing device receives and processes the second processed signal, wherein an appearance of the at least one first physical characteristic measuring device and an appearance of the at least one second physical characteristic measuring device are both spliceable geometric shaped.

2. The measuring apparatus according to claim 1, further comprising:

at least one transmission device, wherein the at least one first physical characteristic measuring device passes the first processed signal through the at least one transmission device to the data processing device, and the second processed signal is passed through the transmission path of the at least one first physical characteristic measuring device and the at least one transmission device to the data processing device in response to the at least one first physical characteristic measuring device and the at least one second physical characteristic measuring device being electrically connected to each other.

3. The measuring apparatus according to claim 2, wherein the at least one transmission device further comprises a power source connection path configured to pass power provided by the data processing device to the at least one first physical characteristic measuring device.

4. The measuring apparatus according to claim 3, wherein the at least one first physical characteristic measuring device further comprises a power source connection point configured to obtain power from the data processing device.

5. The measuring apparatus according to claim 1, wherein the data processing device comprises:

an analog-to-digital converter, coupled to the at least one first physical characteristic measuring device, configured to convert the first processed signal which is analogous into the first processed signal which is digital, and convert the second processed signal which is analogous into the second processed signal which is digital in response to the at least one first physical characteristic measuring device and the at least one second physical characteristic measuring device being electrically connected to each other; and a controller configured to process and provide the first processed signal which is digital, and also process and provide the second processed signal which is digital in response to the at least one first physical characteristic measuring device and the at least one second physical characteristic measuring devices being electrically connected to each other.

6. The measuring apparatus according to claim 1, wherein an appearance of the at least one first physical characteristic measuring device and an appearance of the at least one second physical characteristic measuring device are both puzzle shaped.

7. The measuring apparatus according to claim 1, wherein the at least one first physical characteristic measuring device is a temperature measuring device, the sensor is a thermistor, and the signal processing circuit is a bleeder circuit.

8. A physical characteristic measuring device, comprising:

a sensor configured to generate a measurement signal according to physical characteristics of a location where the physical characteristic measuring device is located;

a signal processing circuit, coupled to the sensor, configured to convert the measurement signal into a first processed signal, wherein the first processed signal is configured to be provided to a data processing device; and a transmission path able to be electrically connected to another physical characteristic measuring device, wherein the transmission path passes a second processed signal of the another physical characteristic measuring device to the data processing device in response to the physical characteristic measuring device and the another physical characteristic measuring device being electrically connected to each other, wherein appearances of the physical characteristic measuring device and the at least one transmission device are spliceable geometric shaped.

9. The physical characteristic measuring device according to claim 8, further comprising:

at least one transmission device, wherein the physical characteristic measuring device passes the first processed signal through the at least one transmission device to the data processing device, and the second processed signal is passed through the transmission path of the physical characteristic measuring device and the at least one transmission device to the data processing device in response to the physical characteristic measuring device and the another physical characteristic measuring device being electrically connected to each other.

10. The physical characteristic measuring device according to claim 8, wherein appearances of the physical characteristic measuring device and the at least one transmission device are puzzle shaped, and the physical characteristic measuring device is a temperature measuring device, the sensor is a thermistor, and the signal processing circuit is a bleeder circuit.

* * * * *